(12) United States Patent
Fink et al.

(10) Patent No.: US 8,684,375 B2
(45) Date of Patent: Apr. 1, 2014

(54) GUARD FOR WHEELED BASE

(76) Inventors: Harvey S. Fink, Bloomfield Hills, MI (US); James Jagodzinski, Commerce Township, MI (US)

( * ) Notice: Subject to any disclaimer, the term of this patent is extended or adjusted under 35 U.S.C. 154(b) by 0 days.

(21) Appl. No.: 13/540,751

(22) Filed: Jul. 3, 2012

(65) Prior Publication Data
US 2014/0008888 A1 Jan. 9, 2014

(51) Int. Cl.
*B62B 3/00* (2006.01)
*A47F 5/16* (2006.01)

(52) U.S. Cl.
USPC ........................................ 280/79.11; 248/129

(58) Field of Classification Search
USPC .................. 280/32.6, 79.11, 79.2, 79.5, 160; 16/18 R, 18 CG, 31 R, 29, 45; 248/129
See application file for complete search history.

(56) References Cited

U.S. PATENT DOCUMENTS

| | | | | |
|---|---|---|---|---|
| 726,035 | A * | 4/1903 | Dorsey | 280/62 |
| 1,402,191 | A * | 1/1922 | Thiele | 16/45 |
| 1,490,890 | A * | 4/1924 | Derschug | 16/38 |
| 2,422,297 | A * | 6/1947 | Frankel | 248/188.7 |
| 2,490,210 | A * | 12/1949 | Cramer et al. | 248/188.7 |
| 2,711,906 | A * | 6/1955 | Rideout et al. | 280/79.5 |
| 2,917,769 | A * | 12/1959 | Kasper | 15/323 |
| 2,920,902 | A * | 1/1960 | Scott | 280/79.2 |
| 3,007,584 | A * | 11/1961 | Way | 414/13 |
| 4,892,279 | A * | 1/1990 | Lafferty et al. | 248/125.8 |
| D308,725 | S * | 6/1990 | Kraus | D24/128 |
| 5,370,111 | A * | 12/1994 | Reeder et al. | 128/202.13 |
| 5,445,396 | A * | 8/1995 | Sebor | 280/33.998 |
| 7,624,953 | B2 * | 12/2009 | Silverman et al. | 248/125.1 |
| 2002/0101050 | A1 * | 8/2002 | Trine et al. | 280/79.5 |
| 2005/0017138 | A1 * | 1/2005 | Hardin | 248/166 |
| 2007/0267550 | A1 * | 11/2007 | Blankenship et al. | 248/125.8 |
| 2008/0283692 | A1 * | 11/2008 | Leinen | 248/125.8 |
| 2011/0140379 | A1 * | 6/2011 | Knieriem et al. | 280/29 |

FOREIGN PATENT DOCUMENTS

GB 2229151 A * 9/1990 ............... B60S 9/14

* cited by examiner

*Primary Examiner* — J. Allen Shriver, II
*Assistant Examiner* — Bridget Avery
(74) *Attorney, Agent, or Firm* — The Weintraub Group, P.L.C.

(57) ABSTRACT

The invention pertains to a guard assembly for securement to a wheeled base. The guard assembly comprises a central support, a plurality of wheel guards positioned in an array around the central support, a plurality of struts, and a plurality of support struts. The struts are connected to and extend between a respective pair of the adjacent wheel guards in the array. Each of the support struts are connected to and extend between the central support and a respective one of the struts. The invention also envelops a method of retrofitting an existing wheeled base with the guard assembly.

17 Claims, 6 Drawing Sheets

GUARD FOR WHEELED BASE

BACKGROUND OF THE INVENTION

1. Field of the Invention

The present invention pertains to a guard for a wheeled base. More particularly, the present invention pertains to a wheeled base having a mast which minimizes entanglement of lines around and under the base. Even more particularly, the present invention pertains to a guard for an intravenous or I.V. stand constructed to minimize entanglement of I.V. lines extending from the I.V. stand.

2. Description of the Prior Art

I.V. stands having wheels are well-known in the art, such as disclosed in U.S. Pat. Nos. 4,892,279 to Lafferty et al. and 4,332,378 to Pryor. The I.V. stands disclosed by Lafferty and Pryor are representative of the types of I.V. stands that are commonly available. Such I.V. stands generally comprise a base and a mast section. At the top of the mast is means for supporting items such as bags or bottles that contain I.V. fluids from which fluid defining lines extend to the patient.

A typical wheeled stand for an I.V. stand generally comprises a plurality of outwardly extending legs. A wheel caster, such as the type generally disclosed in U.S. Pat. No. 4,827,564 to Brown, is usually disposed at the end of each leg. Wheel casters having dual wheels are also often used, such as the types disclosed in U.S. Pat. Nos. 3,997,938 to Pinaire et al., and 4,219,904 to Melara.

It is to be appreciated that although wheeled I.V. stands have been used for many years, the design of such stands has remained substantially the same. While the stands serve their purpose well, the typical I.V. stand also leaves room for improvement. For example, I.V. stands most often have various cords and tubes that are extending between the stand and the patient or other equipment. These cords and tubes are often run over by the wheels of the stand and are prone to entanglement with each other or other objects.

These problems can be especially troublesome because the stand is often supporting bags or bottles that are connected to an I.V. needle inserted into a patient, and it is often the patient who is moving the I.V. stand. While moving the I.V. stand, the patient should be primarily concerned that he or she does not inadvertently remove his or her I.V. needle. Instead, the patient is preoccupied with moving an uncooperative I.V. stand or retrieving tangled cords or tubes from underneath the stand.

In addition, the entangled cords and tubes are a trip hazard to the patient. It is believed that up to 25% of hospital falls are a result of entangled tubes or cords associated with an I.V. stand.

Furthermore, when a patient is fortunate enough to not be hurt by this dangerous situation, he or she will still often require the assistance of a nurse to untangle the cords. Assisting patients with this common nuisance can become very time-consuming for the nurses, which in turn adds significantly to the hospital's overhead costs due to lost productivity.

Thus, there remains a need for a guard for a wheeled base that facilitates retrieving cords or tubes from underneath the stand.

The present invention, as is detailed hereinbelow, seeks to resolve these issues by providing a guard for a wheeled base (an in particular for a wheeled base for an I.V. stand) that allows for quick and easy removal of any cords or tubes that have been run over by the stand.

SUMMARY OF THE INVENTION

In a first embodiment hereof, there is provided, in combination, a wheeled base and guard assembly. The wheeled base has a plurality of legs, and each leg has an end and a wheel assembly secured thereto. The guard assembly comprises a plurality of wheel guards, a plurality of struts, and means for retaining the struts in position. Each of the wheel guards is secured to a respective one of the ends of the legs to at least partially surround the respective wheel assembly. Each of the respective struts extends between, and are connected to, the adjacent pairs of wheel guards.

Optionally, the means for retaining the struts in position can comprise a central support and a plurality of support struts. The central support is positioned atop the wheeled base. At least one of the support struts extends between, and is connected to, the central support and a medial portion of one of the struts.

Optionally, at least one of the ends of the legs has a cavity, and at least one of the wheel assemblies includes a post that extends into the cavity. The post and cavity are dimensioned for close fitment with each other to secure the wheel assembly to the end of the leg. At least one of the wheel guards has a through-hole, whereby the post is inserted through the through-hole and into the cavity to secure the respective wheel guard to the wheeled base.

Optionally, at least one of the wheel guards includes a recess for receiving an end of the respective strut extending between the adjacent wheel guards.

Optionally, at least one of the struts comprises an elongated shaft.

Optionally, at least one of the struts comprises metal.

Optionally, at least one of the wheel guards comprises a polymeric material.

In a second embodiment hereof, there is provided a guard assembly for securement to a wheeled base. The guard assembly comprises:

a central support;

a plurality of wheel guards positioned in an array around the central support;

a plurality of struts, each of the struts being connected to and extending between a respective pair of the adjacent wheel guards in the array; and a plurality of support struts, each of the support struts being connected to and extending between the central support and a respective one of the struts.

In a third embodiment hereof, there is provided a method of retrofitting a guard assembly onto a wheeled base comprising the steps of:

providing the guard assembly having a central support, a plurality of wheel guards, a plurality of struts, each of the struts having a pair of opposed ends and a medial portion, and a plurality of support struts, each of the support struts having a proximal end and a distal end, the proximal end being secured to and extending from the medial portion of each of the respective struts;

providing a wheeled base including a central portion and a plurality of legs that are arranged in an array around the central portion and positioned in adjacent relationship to each other, each of the legs having an end and a wheel assembly attached thereto;

securing the wheel guards to the end of each of the legs;

securing the struts to, and between, the wheel guards that are secured to each of the adjacent wheel assemblies;

placing the central support atop the central portion of the wheeled base; and securing the distal end of each support strut to the central support.

Optionally, the distal end of each of the support struts can include a threaded opening and the central support includes a plurality of openings aligned with the distal ends of the support struts. The method can further include the steps of: providing at least one threaded fastener; and threading the fastener through a respective one of the openings in the central support and into the threaded distal end of the respective support strut.

Optionally, the wheel guards can include a pair of guard holes dimensioned to receive one of the ends of the struts, and the step of securing the struts to the wheel guards can further include inserting the opposed ends into the guard holes from a pair of adjacent wheel guards.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

At the outset it is to be noted that although the ensuing disclosure is made with particular reference to guards for use with intravenous stands, the present invention is not so limited. Rather the present invention has equal efficacy in conjunction with any other types of stands having various lines, cords, tubes, etc. extending therefrom where entanglement of the lines needs to be minimized or eliminated.

Figure 1:
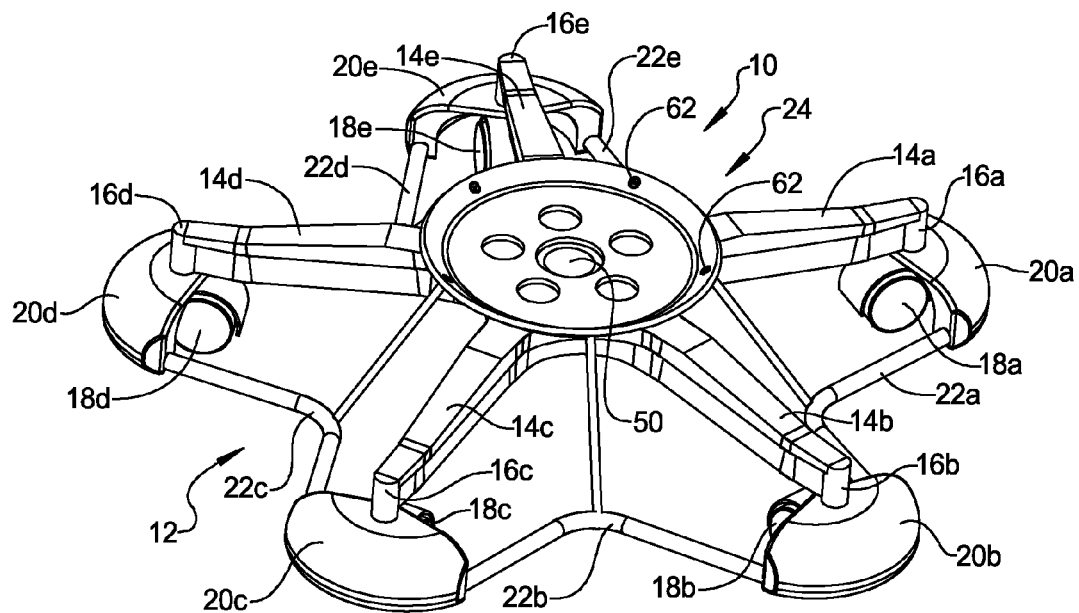
FIG. 1 is a top perspective view of a first embodiment of the present invention hereof.
Figure 2:
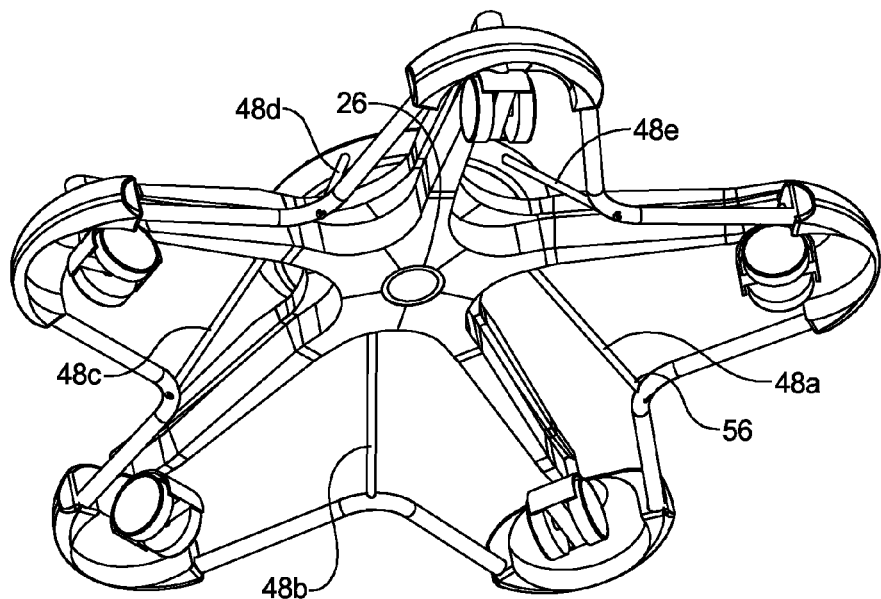
FIG. 2 is a bottom perspective view hereof.
Figure 3:
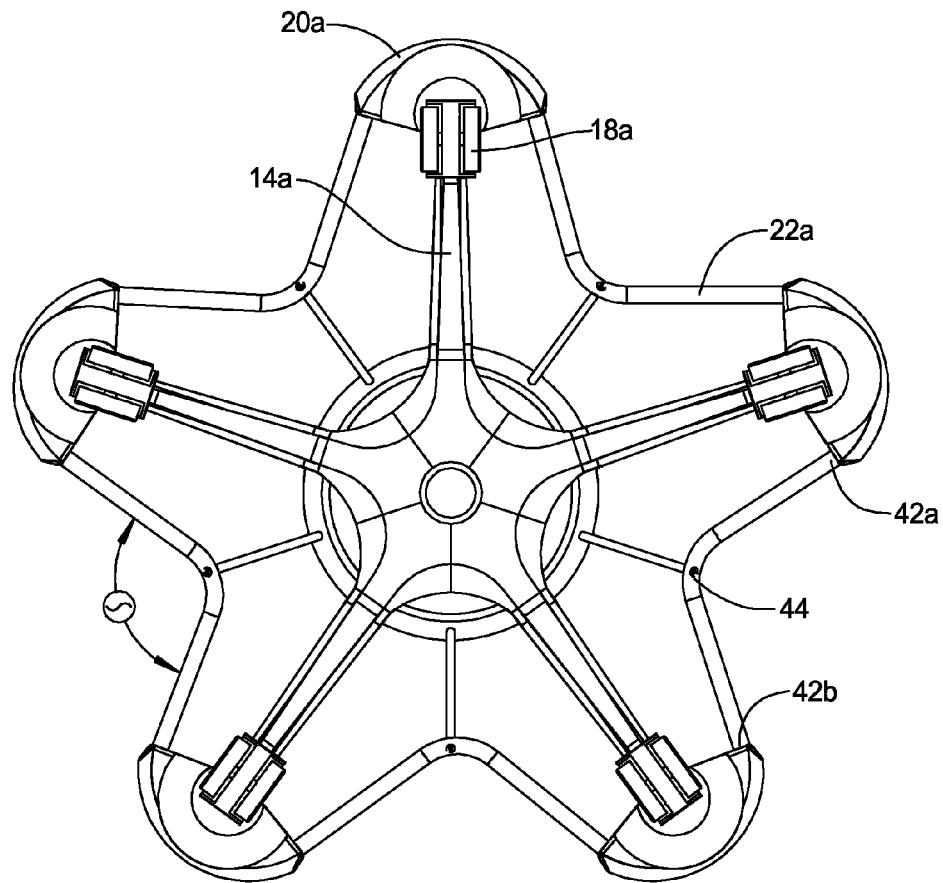
FIG. 3 is a bottom view hereof.

Referring now to the drawings, and in accordance with a first embodiment of the present invention shown generally in FIG. 1, there is provided, in combination, a wheeled base 10 and guard assembly 12. The wheeled base 10 has a plurality of legs 14a,14b, etc., and each leg 14a,14b, etc. has an end 16a,16b, etc. and a wheel assembly 18a,18b, etc. secured thereto. The guard assembly 12 comprises a plurality of wheel guards 20a,20b, etc., a plurality of struts 22a,22b, etc., and means for retaining 24 the struts in position. Each of the wheel guards 20a,20b, etc. is secured to a respective one of the ends 14a,14b, etc. of the legs 14a,14b, etc. to at least partially surround the respective wheel assembly 18a,18b, etc. Each of the respective struts 22a,22b, etc. extends between, and is connected to, a pair of adjacent wheel guards 20a,20b, etc.

The wheeled base 10 can comprise any suitable type of wheeled base which is well-known in the art. It can be attached to a chair, an IV stand, or any other type of object which typically utilizes a wheeled stand. The wheeled base 10 has a plurality of legs 14a,14b, etc., each leg 14a,14b, etc. having an end 16a,16b, etc. with a wheel assembly 18a,18b, etc. secured thereto. Although the plurality of legs 14a,14b, etc. shown in the drawings are radiating or extending outwardly from a common central position, or hub 26, the legs 14a,14b, etc. do not need to be oriented in this manner. Alternatively, the legs 14a,14b, etc. may be in an "H" orientation or any other suitable arrangement. The hub 26 can include a hole, recess, collar, or the other suitable mechanism (not shown) for retaining a vertically-extending mast. The legs 14a,14b, etc. can be formed from any suitable material, including metal, polymer, wood, or any composite material thereof. The ends 14a,14b, etc. of the legs 14a,14b, etc. can have a cavity 28, bored hole, or other suitable recess to secure the wheel assembly 18a,18b, etc. thereto.

The wheel assembly 18a,18b, etc. can comprise any type which is well-known or commonly used. For example, and as shown throughout the drawings, the wheel assembly 18a,18b, etc. can comprise the type which is generally disclosed in U.S. Pat. No. 4,219,904 to Melara, which is hereby incorporated by reference. This type of wheel assembly includes at least one wheel which is rotatably attached to a chassis. The chassis includes an off-centered vertical post for attachment to any suitable object. The post is off-centered to allow the chassis and wheels to self-align with the direction of travel of the object. However, it is noted that the wheel assembly disclosed by Melara is only exemplary of the type of wheel assembly 18a,18b, etc. that can be used herewith. It is intended that any suitable type of wheel assembly which is well-known in the art can be used.

The wheel assembly 18a,18b, etc. is secured to the end 16a,16b, etc. of the leg 14a,14b, etc. by inserting the post (not shown) into the cavity 28 at the end 16a,16b, etc. of the leg 14a,14b, etc. Thus, the post and cavity 28 are preferably dimensioned for close fitment with each other to secure the wheel assembly 18a,18b, etc. to the end 16a,16b, etc. of the leg 14a,14b, etc. The post and cavity 28 preferably (although not necessarily) have a circular cross-section so that they can rotate with respect to each other.

The guard assembly 12 comprises a plurality of wheel guards 20a,20b, etc., and each wheel guard 20a,20b, etc. is associated with, and secured to, an end 14a,14b, etc. of each respective leg 14a,14b, etc. Although the wheel guard 20a, 20b, etc. has an added benefit of protecting the wheels, its primary benefit is to keep any cords, tubes, or the like from becoming entangled with the associated wheel assembly 18a, 18b, etc. The wheel guards 20a,20b, etc. are secured to the ends 14a,14b, etc. of the legs 14a,14b, etc. to at least partially surround the respective wheel assembly 18a,18b, etc.

As shown in FIG. 5a through FIG. 7, each wheel guard 20a,20b, etc. preferably has an arcuate curved outer surface 30 for deflecting the cords, an inner cavity 32 to allow free movement of the wheel assembly 18a,18b, etc., and a through-hole 34 along its upper surface 36. The through-hole 34 facilitates the securement of the wheel guard 20a,20b, etc. to the end 16a,16b, etc. of the leg 14a,14b, etc. whereby the post of the wheel assembly 18a,18b, etc. passes through the through-hole 34 and into the cavity 28 at the end 16a,16b, etc. of the leg 14a,14b, etc. to securely hold the wheel guard 20a,20b, etc. between the leg 14a,14b, etc. and the wheel assembly 18a,18b, etc. The wheel guards 20a,20b, etc. can optionally include at least one guard hole 38 along one of the sides 40a,40b for receiving an end 42a,42b of one of the struts 22a,22b, etc.

The wheel guards 20a,20b, etc. can comprise any suitable material, including metal, ceramic, wood, and so forth. Preferably, the wheel guards 20a,20b, etc. comprise a polymeric material, such as a plastic. The wheel guards 20a,20b, etc. can be formed by any suitable manner or process, such as being machined from stock material or being plastic-mold injected.

Figure 4:
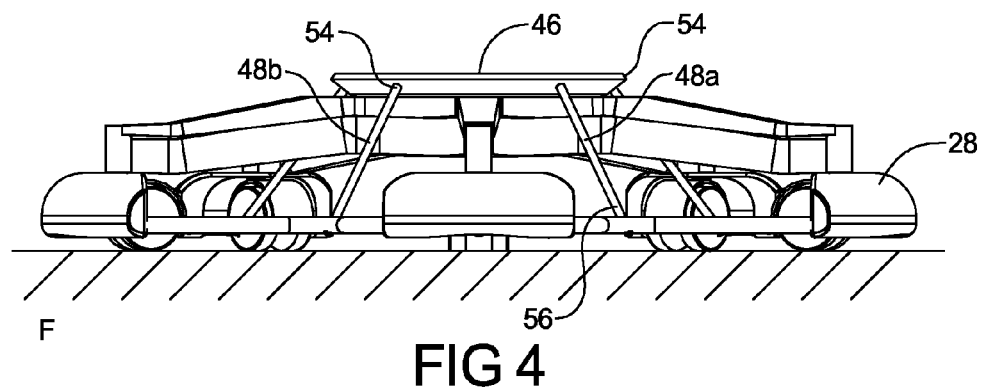
FIG. 4 is a side view hereof.
Figure 5A:
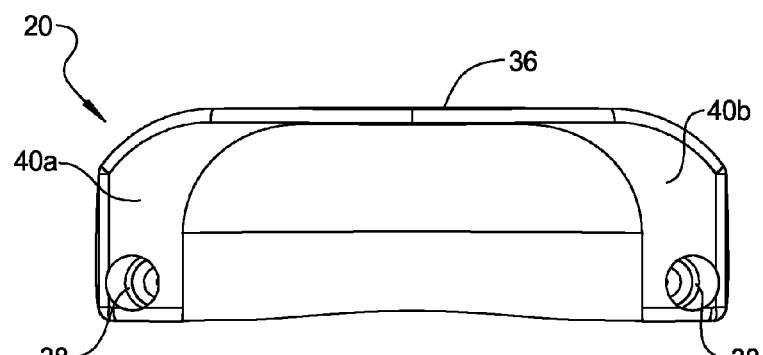
FIG. 5a is a front view of an exemplary wheel guard.
Figure 5C:
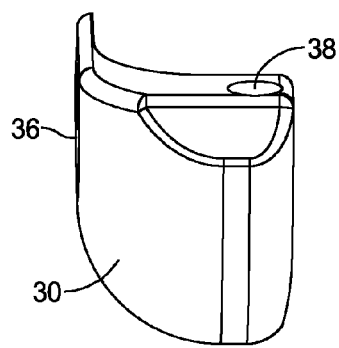
FIG. 5c is a side view of an exemplary wheel guard.
Figure 5B:
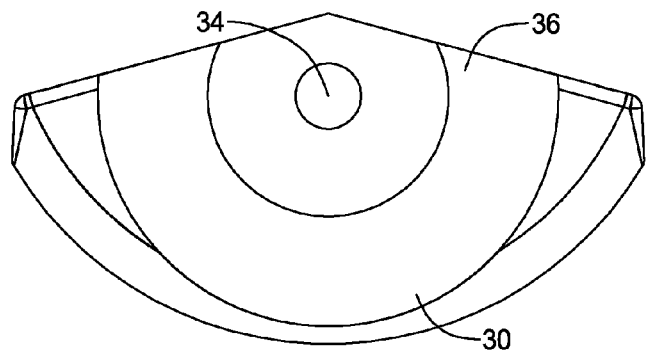
FIG. 5b is a top view of an exemplary wheel guard.
Figure 6:
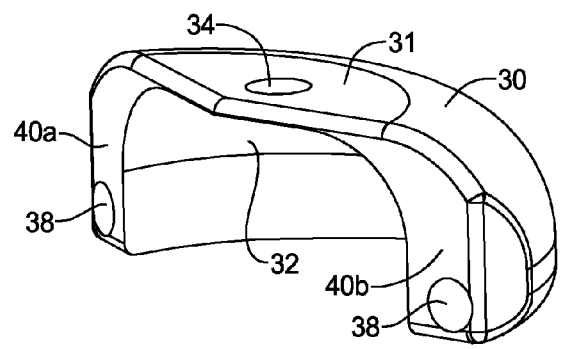
FIG. 6 is a perspective view of an exemplary wheel guard.
Figure 7:
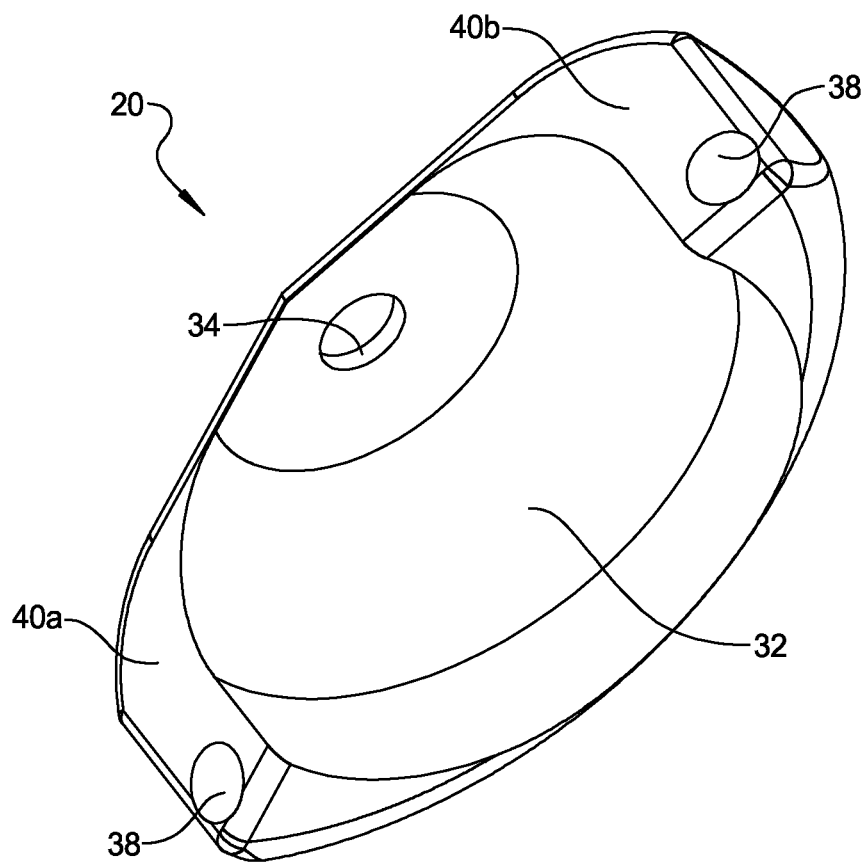
FIG. 7 is a second perspective view of an exemplary wheel guard.
Figure 8:
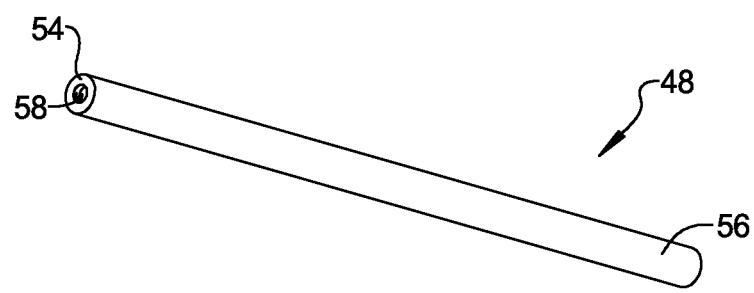
FIG. 8 is a perspective view of a support strut.
Figure 9:
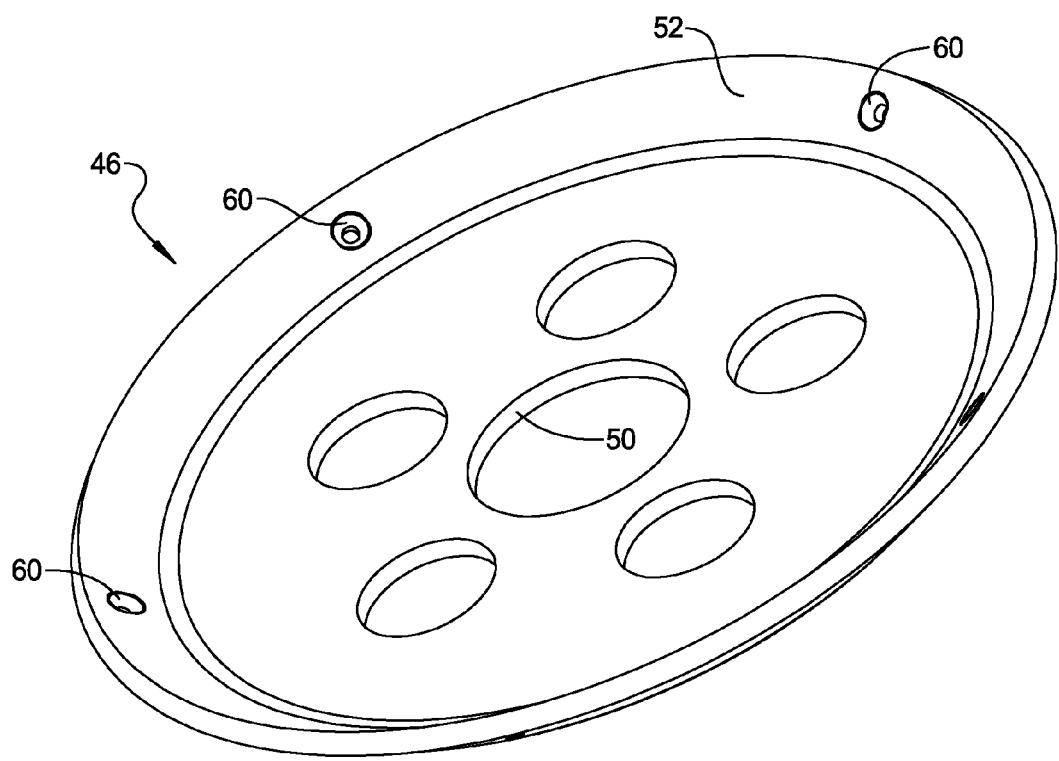
FIG. 9 is a perspective view of a central support.

Referring back to FIGS. 1-4, there is provided a plurality of struts 22a,22b, etc. which are connected to, and extend between each pair of adjacent wheel guards 20a,20b, etc. The struts 22a,22b, etc. comprise an elongated shaft or tube having a pair of opposed ends 42a,42b and a medial portion 44. Preferably, the medial portion 44 is curved toward the wheeled base 10 as shown in the drawings. Although the bend θ will be determined by factors such as the length of the legs 14a,14b, etc. and the distance between the adjacent wheel guards 20a,20b, etc., preferably the bend θ is about 60° to about 160°. Even more preferably, the bend θ is about 90° to about 130°. The struts 22a,22b, etc. can be formed from any suitable material, including metal or a polymeric material. Preferably, the struts 22a,22b, etc. are formed from a lightweight metal such as aluminum. As shown in FIG. 4, the struts 22a,22b, etc. preferably extend between the adjacent wheel guards 20a,20b, etc. along a plane which is parallel with the floor surface F, thereby preferably maintaining a consistent distance between the floor F and the strut 22 along its length thereof.

The means for retaining 24 the struts in position can comprise any suitable device or mechanism for retaining the struts in position with respect to the wheel guards 20a,20b, etc. and the floor surface F. The means for retaining 24 can include fastening the ends 42a,42b of the struts 22a,22b, etc. to the wheel guards 20a,20b, etc. using adhesives, welding, mechanical fasteners like brackets, or the like. Preferably, and as shown in the drawings, the means for retaining 24 the struts in position comprises a central support 46 and a plurality of support struts 48a,48b, etc. The central support 46 is positioned atop the wheeled base 10, and the support struts 48a, 48b, etc. extend between, and are connected to, the medial portions 44 of the struts 22a,22b, etc. and the central support 46, thereby restricting the ability of the medial portion 44 to pivot with respect to the opposed ends 42a,42b.

When provided, the central support 46 can comprise any suitable device which provides a point of secure attachment for the support struts 48a,48b, etc. As shown in the first embodiment hereof, the central support 46 comprises a disk which is positioned atop the hub 26 and includes a central orifice 50 for allowing the vertically-extending mast not shown) to pass therethrough. In this embodiment, the central support 46 includes an outer rim 52 that is angled upward with respect to the disk to provide a flush surface of attachment for the second end 54 of the support struts 48a,48b, etc. However, the disk and outer rim 52 are merely one embodiment of the central support 46, and the invention is not limited to that shown in the drawings. For instance, the central support 46 can be the hub 26 itself, whereby the end of each 54 of the support struts 48a,48b, etc. is attached to the hub 26 via welding, fasteners (e.g., brackets), and so forth.

The support struts 48a,48b, etc. comprise an elongated shaft or tube having the first end 56 attached to the medial portion 44 of the strut 22 and the second end 54 attached to the central support 46. The support struts 48a,48b, etc. may be formed from any of the same materials and have similar construction as the struts 22a,22b, etc. Preferably, the support struts 48a,48b, etc. and the struts 22a,22b, etc. are each formed from metal and welded together to form a very strong connection. The second end 54 can be attached to the central support 46 using any suitable means, such as being welded or being secured via a fastener. Preferably, the second end 54 of each of the support struts 48a,48b, etc. includes a threaded opening 58 and the central support 46 includes a plurality of openings 60a,60b, etc. aligned with the second ends 54 of the support struts 48a,48b, etc. A threaded fastener 62, such as a screw, can be inserted through the opening in the central support 46 and into the threaded second end 54 of the support strut 48.

There is also provided a method of retrofitting the guard assembly 12 onto the wheeled base 10 comprising the steps of: (1) providing the guard assembly 12; (2) providing the wheeled base 10; (3) securing the wheel guards 20a,20b, etc. to the end 16a,16b, etc. of each of the legs 14a,14b, etc.; (4) securing the struts 22a,22b, etc. to, and between, the wheel guards 20a,20b, etc. that are secured to each of the adjacent wheel assemblies; (5) placing the central support 46 atop the central portion of the wheeled base 10; and (6) securing the second end 54 of each support strut 48 to the central support 46.

Optionally, this method can further include the steps of: providing at least one threaded fastener 62; and threading the fastener through a respective one of the openings in the central support 46 and into the threaded second end 54 of the respective support strut 48.

Optionally, this method can also further include the step of securing the struts 22a,22b, etc. to the wheel guards 20a,20b, etc. by inserting the opposed ends 42a,4ab of the struts 22a, 22b, etc. into the respective guard holes 38 from each of the adjacent wheel guards 20a,20b, etc.

In use, it is noted that the guard assembly 12 does not keep the cords or tubes from getting underneath the wheeled base 10. Rather, the wheel guards 20a,20b, etc. keep the cords and tubes from becoming entangled with the wheels, and the struts 22a,22b, etc. provide an advantageous pivot point for pulling the cords and tubes out from under the wheeled base 10. The wheel guards 20a,20b, etc. and struts 22a,22b, etc. are preferably positioned about ½" from the floor F.

Figure 10:
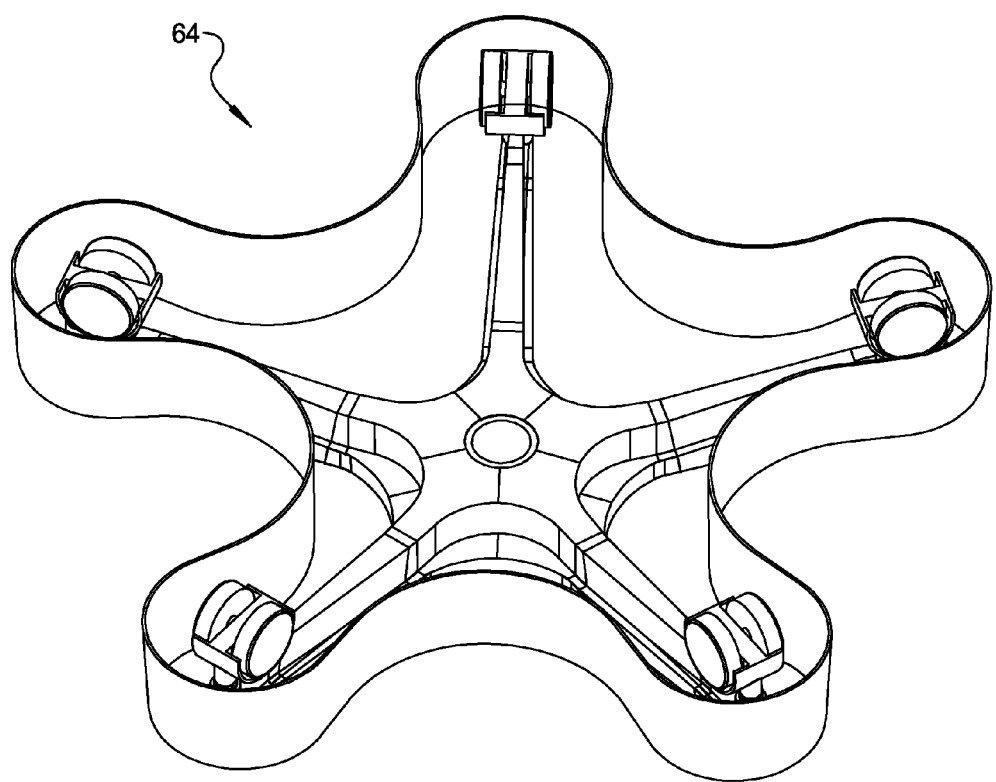
FIG. 10 is a bottom perspective view of yet another embodiment of the present invention.

Yet another embodiment of the invention is shown in FIG. 10. According to this embodiment, there is provided a shield 64 which covers the entire wheeled base 10. The shield 64 can comprise any suitable shape, such as being circular, rectangular, pentagonal, hexagonal, or starfish-shaped (such as shown in FIG. 10). It is apparent that the shield 64 matches the geometry of the wheeled base 10. The shield 64 includes a hole not shown) for allowing the vertical mast to pass therethrough, thereby securing the shield 64 in place over the wheeled base 10.

As mentioned above, the present invention may also be used in any suitable application in which it is desirable to have a mobile base. As such, the present invention may also be used in a variety of industries, such as manufacturing, retail, and so forth.

As is apparent from the preceding, the present invention provides a guard assembly for use with a wheeled base that keeps cords and tubes from becoming entangled underneath the base and allows the patient to easily pull the cords and tubes out from under the wheeled base, thereby increasing patient safety and reducing cost to the hospital by relieving nurses of this common nuisance.

What is claimed is:

1. In combination, a wheeled base and a guard assembly;
the wheeled base having a plurality of legs, each leg having an end and a wheel assembly secured to the end of the leg; and
the guard assembly comprising:
a plurality of wheel guards, each of the wheel guards being secured to a respective one of the ends of the legs to at least partially surround the respective wheel assembly;
a plurality of struts, each strut having a pair of opposed ends and a medial portion, each of the respective struts extending between a respective pair of adjacent wheel guards, the ends of the strut being connected to the respective wheel guards;
a central support positioned atop the wheeled base; and a plurality of support struts, each of the support struts extending between, and being connected to the medial portion of one of the respective struts and the central support.

2. The wheeled base and the guard assembly of claim 1 wherein at least one of the ends of the legs has a cavity and at least one of the wheel assemblies includes a post that extends into the cavity, the post and cavity being dimensioned for close fitment with each other to secure the wheel assembly to the end of the leg, and at least one of the wheel guards has a through-hole, whereby the post is inserted through the through-hole and into the cavity to secure the respective wheel guard to the wheeled base.

3. The wheeled base and the guard assembly of claim 1 wherein at least one of the struts comprises an elongated shaft.

4. The wheeled base and the guard assembly of claim 1 wherein at least one of the struts comprises metal.

5. The wheeled base and the guard assembly of claim 1 wherein at least one of the wheel guards comprises a polymeric material.

6. The wheeled base and the guard assembly of claim 1 wherein at least one of the wheel guards includes a guard hole for receiving the end of the respective strut extending between the adjacent wheel guards.

7. A guard assembly and a wheeled base comprising:
the wheeled base having a central hub and a plurality of legs extending outwardly therefrom and terminating in an end, the hub having a central hole, and a plurality of wheel assembles, a respective wheel assembly from the plurality of wheel assemblies being secured to the end of each respective leg;
a central support positioned atop the hub and having a central orifice for allowing a vertically-extending mast to pass therethrough;
a plurality of wheel guards positioned in an array around the central support;
a plurality of struts, each of the struts having a pair of opposed ends and a medial portion, and each respective strut being connected to and extending between a respective pair of the adjacent wheel guards in the array, the ends of the strut being connected to the respective wheel guards; and
a plurality of support struts, each of the support struts being connected to and extending between the central support and the medial portion of a respective one of the struts.

8. The guard assembly of claim 7 wherein the struts comprise an elongated shaft.

9. The guard assembly of claim 7 wherein the struts and the support struts comprise metal.

10. The guard assembly of claim 7 wherein the wheel guards comprise a polymeric material.

11. The guard assembly of claim 7 wherein the central support comprises a polymeric material.

12. The guard assembly of claim 7 wherein at least one wheel guard includes a complementary guard hole for receiving an end of each respective strut extending between the adjacent wheel guards.

13. The guard assembly of claim 7 wherein the respective struts and support struts are welded together.

14. A method of retrofitting a guard assembly onto a wheeled base comprising the steps of:
providing the guard assembly having a central support, a plurality of wheel guards, a plurality of struts, each of the struts having a pair of opposed ends and a medial portion, and a plurality of support struts, each of the support struts having a first end and a second end, the first end being secured to the medial portion of each of the respective struts;
providing a wheeled base including a central portion and a plurality of legs that are arranged in an array around the central portion and positioned in adjacent relationship to each other, each of the legs having an end and a wheel assembly attached thereto;
securing the wheel guards to the end of each of the legs;
securing the ends of each strut to a respective pair of adjacent wheel guards, whereby each struts is connected to and extends between the wheel guards that are secured to each of the adjacent wheel assemblies;
placing the central support atop the central portion of the wheeled base; and
securing the second end of each support strut to the central support.

15. The method of claim 14 wherein the second ends of each of the support struts includes a threaded opening and the central support includes a plurality of openings aligned with the second ends of the support struts, whereby the method further includes the steps of:
providing at least one threaded fastener; and
threading the fastener through a respective one of the openings in the central support and into the threaded second end of the respective support strut.

16. The method of claim 14 wherein the wheel guards include a pair of guard holes dimensioned to receive one of the ends of the struts, and the step of securing the struts to the wheel guards further includes inserting the opposed ends into a respective one of the guard holes from each of the adjacent wheel guards.

17. The method of claim 15 wherein the wheel guards include a pair of guard holes dimensioned to receive one of the ends of the struts, and the step of securing the struts to the wheel guards further includes inserting the opposed ends into a respective one of the guard holes from each of the adjacent wheel guards.

* * * * *